United States Patent [19]

Storey et al.

[11] Patent Number: 5,458,796
[45] Date of Patent: Oct. 17, 1995

[54] SYNTHESIS OF POLYISOBUTYLENE STAR-BRANCHED POLYMERS VIA LIVING CARBOCATIONIC POLYMERIZATION

[75] Inventors: Robson F. Storey, Hattiesburg, Miss.; Donn A. Dubois; Dale L. Handlin, Jr., both of Houston, Tex.; Bret J. Chisholm, Mt. Vernon, Ind.

[73] Assignee: Shell Oil Company, Houston, Tex.

[21] Appl. No.: 220,810

[22] Filed: Mar. 31, 1994

[51] Int. Cl.⁶ .................... C10M 143/00; C08F 293/00
[52] U.S. Cl. .................. 252/58; 545/10; 545/11; 545/12; 525/98; 525/314; 525/319
[58] Field of Search ................ 252/58; 525/98; 585/10, 11, 12

[56] References Cited

U.S. PATENT DOCUMENTS

| | | | |
|---|---|---|---|
| 4,276,394 | 6/1981 | Kennedy et al. | 525/245 |
| 4,316,973 | 2/1982 | Kennedy | 525/335 |
| 4,342,849 | 8/1982 | Kennedy | 525/333.7 |
| 4,429,099 | 1/1984 | Kennedy et al. | 528/98 |
| 4,486,572 | 12/1984 | Kennedy | 525/283 |
| 4,568,732 | 2/1986 | Kennedy et al. | 526/206 |
| 4,711,866 | 12/1987 | Kuntz | 502/152 |
| 4,942,210 | 7/1990 | Kuntz | 526/348.7 |
| 4,946,899 | 8/1990 | Kennedy et al. | 525/244 |
| 5,219,948 | 6/1993 | Storey et al. | 525/314 |
| 5,395,885 | 3/1995 | Kennedy et al. | 525/98 |

FOREIGN PATENT DOCUMENTS

| | | |
|---|---|---|
| 0509357 | 4/1992 | European Pat. Off. . |
| 93/06138 | 9/1992 | WIPO . |

OTHER PUBLICATIONS

New Polyisobutylene–base model ionomers, Further mechanical and structural studies, Mohajer et al., Polymer Bull. (Berlin), 892–3–4), 47–54 (CA97(24):199348a (month N/A).
New Polisobutylene–based model ionomers, Part I—Synthesis and characterization, Kennedy, Proc. IUPAC, I.U.P.A.C., Macromol. Synp., 28th, 905, CA99(18):140532u (month N/A).
I. Effect of molecular weight and excess neutralizing agent in model elastomeric sulfonated polyisobutylene–based ionomers, Bagrodia et al. J. Appl. Polym. Sci., 29(10), 3065–73 CA101(22):193444h (month N/A).
IV. Strain–induced crystallization of low–molecular–weight model ionomers, Bagrodia et al., Polym. Bull. (Berlin), 8(–6), 281–5, CA97(24):199365d (month N/A).
New Polyisobutylene–based ionomers: synthesis and model experiments, Kennedy et al., Org. Coat. Appl. Polym. Sci. Proc., 46, 182–5. CA100(2):7312v (month N/A).
An approach to the synthesis of multi–ion telechelic ionomers, Storey et al. J. Polym. Sci., Part A: Chem., 31(1), 35–44 CA118(6):39573u (month N/A).
Precursor to multi–ion telechelic ionomers, Storey et al., Polym. Prepr. (Am. Chem. Soc., Div. Polym. Chem.), 32(1), 184–5 CA115(16):159958h (month N/A).
Application to the tert–chloride–terminated polyiosbutylene system, Storey et al., J. Polym. Sci., Part A: Polym. Chem., 29(3), 317–25 CA114(18):165051c (month N/A).
Living carbocationic polymerization of three–arm star polyisobutylene, Storey et al., Polym. Prepr. (Am. Chem. Soc., Div., Polym. Chem.), 30(2), 162–3, CA112(2):7986r (month N/A).
Effects of architecture and molecular weight on viscosity behavior in a nonpolar solvent, Tant et al., Polym. Bull. (Berlin), 13(6), 541–8, CA103(18):142624a (month N/A).
Investigation of 1,3,5–tris(2–methoxypropane benezen/boron trichloride initiated living . . . , Zsuga et al., Polym. Bull. (Berlin), 23(3), 335–40, CA113(8):59891w (month N/A).

Primary Examiner—Ellen M. McAvoy
Attorney, Agent, or Firm—Keith M. Tackett

[57] ABSTRACT

The present invention is the synthesis of star polymers containing polyisobutylene (PIB) via the arm-first, core-last method. These polymers are superior in properties to known hydrogenated polyisoprene star-branched polymers due to their inherent lack of unsaturation.

9 Claims, No Drawings

SYNTHESIS OF POLYISOBUTYLENE STAR-BRANCHED POLYMERS VIA LIVING CARBOCATIONIC POLYMERIZATION

FIELD OF THE INVENTION

This invention relates to star-branched polymers which are macromolecules consisting of linear polymer chains (arms) that radiate outward from a central core.

BACKGROUND OF THE INVENTION

Star-branched polymers are of substantial commercial interest due to their markedly different dilute solution behavior compared to linear, random-coil counterparts. In addition, they have important commercial applications, most notably as viscosifiers in lubricating oils, due to their superior resistance to shear-induced thermal degradation. With the exception of classical condensation polymerization systems and closely related ring-opening polymerizations, star-branched polymers have been produced by three different methods using, in most cases, living anionic polymerization. The most popular method, termed the "linking" method, involves the initiation of monomers such as styrene, butadiene, or isoprene with an organolithium initiator to produce living polymeric monoanions that are subsequently reacted, in exact stoichiometric proportions or in slight excess, with a multifunctional linking agent to form star-branched polymers. The advantage of this method is that the number of arms per molecule within a given sample is invariant and precisely controlled by the functionality of the linking agent.

Star-branched polymers have also been synthesized by sequential addition of a di- or polyfunctional vinyl compound such as divinylbenzene to living, monofunctional polymeric anions. This second general method which may be described as an "arm-first, core-last" method, is particularly suited to the preparation of star-branched polymers with many arms. The first step of the synthesis involves the generation of living polystyryllithium. A small amount of difunctional vinyl compound such as divinylbenzene is charged to the reaction, and this initially forms a short block segment of divinylbenzene with pendent vinyl groups. The last step of the mechanism involves inter- and intramolecular reactions (microgel formation) of these vinyl groups with living anions to give a star-shaped polymer in which the arms are radially attached to a microgel core.

The third general method for producing star-branched polymers, termed the "core-first, arm-last" method, involves the use of a multifunctional initiator that is either prepared externally to the polymerization reaction or in-situ, just prior to polymerization of the arm-forming monomer. Externally prepared multifunctional anionic initiators have been generally less successful due to poor solubility of low-molecular weight polyanions, and the few reported examples require polar-solvent conditions.

A successful variation of this method, which is also closely related in principle to the arm-first, core-last method, involves the in-situ formation of a plurifunctional anionic initiator by the reaction of an excess of difunctional vinyl compound such as divinylbenzene with butyllithium in dilute solution. This reaction produces a population of soluble gel particles, each of which is coated with a number of carbanions which are capable of initiating a subsequent charge of monomer to produce a star-branched polymer molecule.

Recent developments in the field of living carbocationic polymerization have enabled the synthesis of various vinyl ether star-branched polymers by the arm-first, core-last method. An $HI/ZnI_2$ initiating system has been used at $-40°$ C. in toluene to produce living poly(isobutyl vinyl ether) cations to which a small amount of divinyl ether such as that shown below,

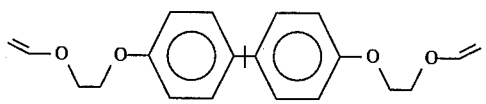

was added to produce star-branched polymers. Polymers ranging in arm number from 3 to 60 were produced by this method. The $Hi/ZnI_2$ initiating system provides living character to the isobutyl vinyl polymerization through the intimate interaction between growing chain ends and their binary $I^-\ldots I_2$ counterionic moieties which render the chain ends reactive toward propagation but unreactive toward higher energy chain transfer and termination reactions. This method of living carbocationic polymerization has been termed "stabilization by a suitably nucleophilic counterion," and has been successfully used to produce living carbocationic polymerizations of monomers such as vinyl ethers, p-methoxystyrene, and N-vinyl carbozole, which form highly stabilized carbocations.

A more recent development, involving the addition of Lewis bases such as ethyl acetate, dimethyl sulfoxide, and dimethyl acetamide to the reaction medium of a carbocationic polymerization, has been found to provide living characteristics to the cationic polymerization of monomers which form relatively unstable carbocations, such as isobutylene (IB) and styrene, in addition to those monomers which form relatively stable carbocations. This method of living carbocationic polymerization has been termed "electron donor mediated cationic polymerization," since the Lewis base or a Lewis base:Lewis acid (coinitiator) complex is believed to provide stabilization to growing polymer chains. The most obvious manifestation of this stabilization is a dramatic decrease in the overall rate of polymerization, which is most often attributed to the formation of an equilibrium between a large number of dormant (reversibly terminated) chain ends and a small number of active chains.

An improved Lewis base mediated polymerization system for the living carbocationic polymerization of isobutylene (IB) consists of a di- or trifunctional cumyl chloride-type initiator in conjunction with $TiCl_4$ as coinitiator and pyridine as an externally added Lewis base (electron donor) in a 60/40 hexane/methyl chloride solvent system at $-80°$ C. The improved system has been utilized to produce telechelic ionomers possessing a narrow MWD between ionic groups, poly(styrene-b-isobutylene-b-styrene) (S-IB-S) block copolymers, and S-IB-S block copolymer ionomers.

SUMMARY OF THE INVENTION

The present invention is the synthesis of star polymers containing polyisobutylene (PIB) via the arm-first, core-last method. These star polymers are superior in properties to known hydrogenated polyisoprene star-branched polymers for use as viscosifiers for lubricating oils due to their inherent lack of unsaturation and their relatively flat temperature/viscosity profiles.

DETAILED DESCRIPTION OF THE INVENTION

The synthesis of star-branched polymers comprising polyisobutylenes involves first the living carbocationic polymerization of isobutylene homopolymers, random copolymers, or block copolymers using a monofunctional initiator and a TiCl$_4$/pyridine cocatalyst as described in U.S. Pat. No. 5,219,948, which is incorporated by reference herein. The monofunctional initiator is a monochloro hydrocarbon which initiates living carbocationic polymerization. Preferably, the living initiator is 2-chloro-2,4,4-trimethylpentane, which must be distilled just prior to use to obtain lower polydispersity, 1-(2-chloro- 2-propyl)-3,5-di-tert-butylbenzene, which is most preferred for its stability and resulting low polydispersity or, 2-chloro-2-propylbenzene (cumyl chloride), which can be used alone or as a 1:1 adduct with isobutylene, the adduct being 2-chloro-2,4-dimethyl-4-phenylpentane.

The initiator could contain non-polymerizing ester groups such as the following known initiator:

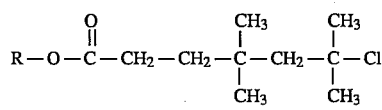

wherein R is an alkyl group having from 1 to 8 carbon atoms. Other useful initiators include the peroxide derived initiators described in European Patent No. 355,957.

The chloro initiators can be substituted by closely related compounds in which the chloride function has been replaced by —OMe, —OAc, —OH, —OOH, —OOR, —OCOOR, and —OCOAc.

The initiator system readily polymerizes olefins, conjugated dienes, monoalkenyl aromatic compounds, and combinations thereof to form living polymers as described in U.S. Pat. No. 5,219,948. Then, to the living polymer chains, a small amount of 1,3-diisopropenylbenzene is added to form the crosslinked core of the star-branched polymers.

The rate of polymerization of the living polymer chains must be known so that the optimum time of addition of 1,3-diisopropenylbenzene can be determined. As described in U.S. Pat. No. 5,219,948, addition of a second monomer to living polyisobutylene chains must be done within a relatively narrow window of isobutylene conversion to achieve satisfactory results. Generally, the isobutylene conversion should be above 70, but not higher than 95%, and most preferably between 80% and 93%.

The star polymers of the invention are excellent viscosity index improvers for lubricating oils when the peak molecular weight of the arms ranges from 500 to 1,000,000, when the number of arms exceeds an average of about 3 per molecule.

The invention is further described by the following experiments which are not intended to limit the invention to specific embodiments.

Hexane and 1,3-diisopropenylbenzene were distilled from calcium hydride just prior to use. Isobutylene and methyl chloride (Linde Div., Union Carbide Corp.) were dried by passing the gaseous material through a column packed with BaO and CaCl$_2$. 2,4,4-Trimethyl- 1-pentene, titanium tetrachloride, pyridine, and anhydrous methanol were used as received from Aldrich Chemical Co., Sulfuric acid, methylene chloride, calcium chloride, and sodium chloride were used as received from Fisher Chemical Co.

The initiators, 2-chloro-2,4,4-trimethylpentane (TMPCl), 2-chloro-2-propylbenzene (cumyl chloride), 1-(2-chloro-2-propyl)-3,5-di-tert-butylbenzene, and 2-chloro 2,4-dimethyl-4-phenylpentane, are prepared as follows:

(Preparation of 2-chloro-2,4,4-trimethylpentane (TMPCl)

Into a three-necked, round-bottomed flask equipped with gas inlet and outlet tubes, magnetic stirrer, and external ice/water cooling bath were charged 21 g 2,4,4-trimethyl-1-pentene (TM1P) and 200 mL MeCl$_2$. HCl gas was produced in a separate reactor by addition of sulfuric acid to solid NaCl. The gas was passed through a column packed with anhydrous CaCl$_2$ and then bubbled continuously into the TM1P solution with stirring for 6 hours at ice bath temperature. Excess HCl and MeCl$_2$ were vacuum stripped leaving a near-quantitative yield of very pale green liquid. $^1$H NMR (ppm): 1.05 (9H), 1.67 (6H), 1.87 (2H).

(Preparation of 2-chloro-2-propylbenzene (Cumyl chloride))

Into a three-necked, round-bottomed flask equipped with gas inlet and outlet tubes, magnetic stirrer, and external ice/water cooling bath were charged 20 g isopropenylbenzene ($\alpha$-methylstyrene) and 200 mL MeCl$_2$. HCl gas was produced in a separate reactor by addition of sulfuric acid to solid NaCl. The gas was passed through a column packed with anhydrous CaCl$_2$ and then bubbled continuously into the isopropenylbenzene solution with stirring for 6 hours at ice bath temperature. Excess HCl and MeCl$_2$ were vacuum stripped leaving a clear liquid product. The production of cumyl chloride is improved greatly by using a 75:25 volume ratio of methylene chloride:hexanes as the solvent instead of pure methylene chloride.

(Preparation of 1-(2-chloro-2-propyl)-3,5-di-tert-butylbenzene (Proposed))

Preparation of methyl 3,5-di-tert-butylbenzoate. Into a 250 mL three-necked, round-bottomed flask equipped with a magnetic stirrer and reflux condenser are charged 23.4 g (0.1 mole) 3,5-tert-butylbenzoic acid (Aldrich), 100 mL methanol, and 1 mL sulfuric acid. The reaction mixture is allowed to reflux overnight, cooled to room temperature, and then refrigerated overnight, during which time the product precipitates from the solution. The crude product is collected by filtration, washed with distilled water several times to remove sulfuric acid, dried at 50° C., and recrystallized from methanol.

Preparation of 1-(2-hydroxy-2-propyl)-3,5-di-tert-butylbenzene. Into a 500 mL round-bottomed flask, equipped with a mechanical stirrer, dry nitrogen inlet and outlet tubes, dripping funnel with a pressure equalizing side-arm, and external ice water cooling bath, are charged 19.8 g (0.08 mole) methyl 3,5-di-tert-butylbenzoate and 100 mL anhydrous THF. A solution of methyl magnesium bromide in THF (65 mL of a 3M solution) is added dropwise to the solution at 0° C. over a period of 30 minutes. The reaction is allowed to stand at room temperature overnight and the charge is slowly added to a mixture of 11 g of NH$_4$Cl and 160 g ice. The product is extracted from the mixture using several aliquots (100 mL) of diethyl ether. The extract is dried over magnesium sulfate, the diethyl ether is removed by vacuum-stripping, and the product is recrystallized from ethyl acetate.

Preparation of 1-(2-chloro-2-propyl)-3,5-di-tert-butylbenzene. To a 1000 mL three necked, round-bottom flask equipped with gas inlet and outlet tubes, mechanical stirrer, and external ice water cooling bath, are charged 9.92 (0.04 mole) 1-(2-hydroxy-2-propyl)- 3,5-di-tert-butylbenzene, 10 g anhydrous CaCl$_2$, and 100 mL methylene chloride. HCl gas is generated in a separate reactor by addition of concentrated sulfuric acid to solid NaCl. The gas is passed through a column packed with anhydrous CaCl$_2$ and then bubbled continuously into the solution with stirring for 10 hours. The alcohol is not soluble in methylene chloride but is observed to slowly go into solution as it reacts. Excess HCl and MeCl$_2$ are vacuum stripped, and the product is twice recrystallized from hexanes.

(Preparation of 2-chloro-2,4-dimethyl-4-phenylpentane (Proposed))

The following procedure is conducted in a dry box under dry $N_2$ atmosphere at $-40°$ C. Into a 500 mL three-necked, round-bottomed flask equipped with mechanical stirrer are added 30 g (0.19 mole) cumyl chloride, 200 mL hexane, 200 mL methyl chloride, and 11.4 g (0.20 mole) isobutylene. With vigorous stirring, 50 g (0.43 mole) $BCl_3$ is added rapidly to the mixture. After 10 minutes, 45 mL pre-chilled MeOH is added to terminate the reaction, and the reactor is removed from the dry-box. The $MeCl_2$ is caused to evaporate as the contents of the reactor are allowed to warm to room temperature with stirring. The remaining mixture is washed twice with 200 mL of 0.5N aqueous HCl and twice with 200 mL distilled water and then dried over $MgSO_4$. The product is isolated by evaporation of the hexane.

EXAMPLE 1

Polymerization was conducted in a glove box, equipped with an integral cold bath, under a dry nitrogen atmosphere at $-80°$ C. In one experiment, a chilled 2000 ml three-necked, round-bottomed flask was charged with 400 ml methyl chloride, 600 ml hexane, 87 ml (1.1 mole) isobutylene, 0.2 g ($1.3 \times 10^{-3}$ mole) 2-chloro-2,4,4-trimethylpentane, and 0.1 ml ($1.3 \times 10^{-3}$ mole) pyridine. After stirring the solution for approximately 15 min, 1.5 ml ($1.3 \times 10^{-2}$ mole) $TiCl_4$ was added quickly to the vigorously stirred reaction mixture to initiate the polymerization. At a reaction time of 40 min, an aliquot of approximately 100 ml was taken from the reaction mixture and immediately quenched with methanol. Just after removal of the aliquot, 0.2 ml ($1.17 \times 10^{-3}$ mole) 1,3-diisopropenylbenzene was added to the reaction mixture. The polymerization was allowed to continue for an additional 210 min before quenching with 30 ml of pre-chilled methanol.

The aliquot and the remaining terminated reaction mixture were allowed to warm to room temperature with stirring to remove methyl chloride. A volume of hexane was added to each sample, approximately equal to the volume lost by methyl chloride evaporation. The hexane solutions were then washed twice with 5.0% aqueous HCl and then twice with DI water. Finally, the solutions were dried with magnesium sulfate and freed of hexane by vacuum-stripping.

EXAMPLE 2

In a second experiment, a chilled 3000 ml three-necked, round-bottomed flask was charged with 920 ml methyl chloride, 1380 ml hexane, 200 ml (2.5 mole) isobutylene, 0.46 g ($3.1 \times 10^{-3}$ mole) 2-chloro-2,4,4-trimethylpentane, and 0.25 ml ($3.1 \times 10^{-3}$ mole) pyridine. After stirring the solution for approximately 15 min, 3.5 ml ($3.1 \times 10^{-2}$ mole) $TiCl_4$ was added quickly to the vigorously stirred reaction mixture to initiate the polymerization. At reaction times of 20, 40, 64, and 88 min, additional charges of IB (75 ml, 0.95 mole) were added to the reaction mixture. At a reaction time of 217 min, 1400 ml of the reaction mixture was transferred to a chilled 2000 ml three-necked, round-bottomed flask via a chilled graduated cylinder, and to this portion was immediately added 0.27 ml ($1.6 \times 10^{-3}$ mole) 1,3-diisopropenylbenzene. Just after the addition of 1,3-diisopropenylbenzene, approximately 800 ml of the original reaction mixture (no 1,3-diisopropenylbenzene added) was poured into a chilled 2000 ml round, bottomed flask and immediately quenched with 30 ml methanol. The remaining original reaction mixture, and the reaction mixture to which 1,3-diisopropenylbenzene was added, were each quenched with methanol at a reaction time of 500 min.

Gel permeation chromotography (GPC) was performed using a Waters Associates GPC system equipped with a Rheodyne injector, a Waters model 510 HPLC solvent delivery pump, three Ultrastyragel columns of nominal pore sizes 500, $10^3$, and $10^4$ Å, and a Waters model 410 differential refractometer detector operating at 33° C. Tetrahydrofuran (THF), freshly distilled from calcium hydride, served as the mobile phase, and was delivered at a flow rate of 1.0 ml/min. Sample concentrations were approximately 0.5% (w/w) in THF, with an injection volume of 50 ml. Molecular weights were calculated relative to PIB standards of narrow molecular weight distribution.

The compound, 2-chloro-2,4,4-trimethylpentane (TMPCl), has been used frequently as a monofunctional initiator for the carbocationic polymerization of isobutylene and as a result was chosen for use as initiator in PIB star branched polymer synthesis. Two commercially available core-forming comonomers were considered as candidates for PIB star-branched polymer synthesis, those being divinylbenzene and 1,3-diisopropenylbenzene (DIPB). It was thought that divinylbenzene would provide the best results, since styrene has been shown to react readily with PIB carbocationic chain carriers derived from the dicumyl chloride/$TiCl_4$/pyridine initiating system, while α-methylstyrene has not. Commercially available divinylbenzene (Aldrich Chemical Co.) comes as a mixture of isomers with a purity of only 55.0%, with the major contaminants being 3- and 4-ethylvinylbenzene. DIPB, which is 97.0% pure, was chosen from the investigation to avoid the possibility of side reactions.

In Example 1, living PIB cations with Mn =14,400 g/mole by (GPC) were produced using the TMPCl/$TiCl_4$/pyridine initiating system and subsequently reacted with an amount of DIPB calculated to provide a 1:1 molar ratio between living arms and DIPB, assuming 100% initiation efficiency of TMPCl. The molecular weight of the living arm was considerably lower than theoretical indicating a rather low (~30%) conversion of IB at the time of DIPB addition. The molecular weight of the polymers produced in the presence of DIPB (star) were much higher than those removed prior to the addition of DIPB (arm) as evidenced by the shift to lower elution time upon the addition of DIPB. This result shows that DIPB did indeed react with polyisobutylene carbocations and effectively linked PIB chains. The GPC trace of the arm displays a lower elution time (high molecular weight) which may be due to initiation by impurities.

Due to the fact that in the above experiment DIPB was added at a time when substantial amounts of IB remained in the reaction mixture, it remained to be shown that the increase in molecular weight after the addition of DIPB was due to core formation and star-branching and not just simply further conversion of isobutylene. Thus, the polymerization of Example 2 was conducted in which a fraction of the living polyisobutylene chains was not subjected to the DIPB addition but rather was allowed to propagate for the same period of time as the polymers receiving DIPB. In addition, an incremental monomer addition (IMA) technique was utilized during arm formation in an attempt to obtain higher molecular weight arms (Mn = 40,500 g/mole) while maintaining a relatively high rate of polymerization.

As can be seen from GPC traces, the molecular weight of the star sample was higher than that of the control sample, yielding further support to the conclusion that DIPB reacted with, and subsequently linked, polyisobutylene arms to produce star-branched polymers.

Although the previously discussed GPC results for Examples 1, 2, and 3 demonstrate that DIPB can be used to link living PIB chains, they do not allow for a determination of the average number of PIB chains (arms) linked per molecule, due to the well known fact that star polymers possess lower hydrodynamic volumes in solution than linear counterparts of equivalent molecular weight. The number of arms in the star polymer can only be calculated by comparing the molecular weight of the arm sample to that of the star sample, the latter determined using some method of absolute molecular weight determination, such as membrane osmometry or light scattering.

It has been shown by GPC that the production of the living carbocationic polymerization of IB using a TMPCl/TiCl$_4$/pyridine initiating system in conjunction with a subsequent addition of DIPB to the reaction medium is a viable method for the synthesis of PIB star-branched polymers. Relationships between the effect of relative DIBP concentration to TMPCl concentration, as well as the effect of reaction time, both before and after the addition of DIPB, on the average number of arms per molecule are readily determined by persons skilled in the art.

EXAMPLE 3

To a chilled 3000 mL three-necked, round-bottomed flask equipped with mechanical stirrer were charged 1200 mL hexane, 800 mL methyl chloride, 171 mL (2.17 mole) isobutylene, 0.33 mL ($4.1 \times 10^{-3}$ mole) pyridine, and 0.60 g ($4.1 \times 10^{-3}$ mole) 2-chloro-2,4,4-trimethylpentane. The solution was allowed to stir for approximately 20 minutes, at which time the mixture was divided evenly (four 500 mL portions) into four 1L three-necked, round-bottomed reaction flasks. Polymerization was initiated in reactors 1 and 2 by the addition, with vigorous stirring, of 0.97 mL ($9.3 \times 10^{-4}$ mole) TiCl$_4$ to each flask; reaction mixtures 3 and 4 were set aside for use in Example 4 below.

After a reaction time of 6 h (70% conversion) a 100 mL aliquot was removed from reactor 1 and quenched with prechilled methanol, and immediately 0.12 mL ($7.0 \times 10^{-4}$ mole) 1,3 diisopropenylbenzene (DIPB) was added to the remaining volume of reactor 1. Reaction mixtures 1 and 2 were allowed to continue to react for 3 hours, at which time they were terminated with 30 mL pre-chilled methanol. The reaction mixtures were then allowed to warm to room temperature with the accompanying evolution of methyl chloride. To each sample was added 300 mL hexane, and the resulting solutions were washed 3 times with 5% aqueous HCl and 2X with distilled water. The solutions were dried over MgSO$_4$ and filtered, and then the hexane was removed using a rotary evaporator and by subsequent storage of the samples in a vacuum oven for 4 days.

EXAMPLE 4

Reaction mixtures 3 and 4 from above were initiated by addition of 0.97 mL ($9.3 \times 10^{-4}$ mole) TiCl$_4$ to each reactor. After a reaction time of 7.5 h (85% conversion), a 100 mL aliquot was removed from reactor 3 and quenched with prechilled methanol, and immediately 0.12 mL ($7.0 \times 10^{-4}$ mole) 1,3 diisopropenylbenzene (DIPB) was added to the remaining volume of reactor 3. Reaction mixtures 3 and 4 were allowed to continue to react for 3 hours, at which time they were terminated with 30 mL pre-chilled methanol. The reaction mixtures were then subjected to the same work-up as described above.

In Example 3, the DIPB was added at too low an isobutylnene conversion. GPC traces of the 100 mL aliquot (arm) and fully reacted star polymer (star) were obtained from reactor 1. Examination of the GPC trace for the star peak revealed that it is trimodal, consisting of two high MW fractions that are presumably star-branched, and a low MW fraction that appears to consist of arms that have increased in MW due to further polymerization, but that have not become incorporated into star polymers. Apparently, DIPB and leftover IB compete for the living chains, and the star formation process is slow and incomplete. It is believed that the existence of two higher MW fractions is related to the presence of a high MW tail that is visible in the GPC trace of the arm. In contrast, GPC traces of the precursor arm and star-branched product formed by addition of DIPB at 85% IB conversion (Example 4) shows that the star peak is now only slightly bimodal, and there appears to no longer be any unreacted arm. It is believed that if the precursor arm peak had not had the pronounced high MW tail, that the star would have been monomodal. These experiments demonstrate the importance of proper timing of DIPB addition. In addition, to obtain well-defined products and easily interpretable results, the precursor arm must possess a narrow, monomodal MWD.

We claim:

1. A process for making a star polymer, comprising the steps of:

polymerizing isobutylene with an initiator to form living polymers, and coupling the living polymers after polymerization of above 70% but not higher than 95% of the isobutylene to give an average of at least 3 arms per star molecule.

2. The process of claim 1, wherein the living polymers are homopolymers of isobutylene, random copolymers of isobutylene and a conjugated diene or a monoalkenyl aromatic compound, or block copolymers of isobutylene and a conjugated diene or a monoalkenyl aromatic compound.

3. The process of claim 1, wherein the initiator is 2-chloro-2,4,4-trimethylpentane or 1-(2-chloro-2-propyl)-3,5-di-tert-butylbenzene.

4. The process of claim 1, wherein the polymerization of the isobutylene occurs in the presence of TiCl$_4$ and pyridine.

5. The process of claim 4, wherein the initiator is 1-(2-chloro-2-propyl)- 3,5 -di-tert-butylbenzene.

6. The process of claim 1, wherein the isobutylene is polymerized to between 80% and 93% completion before coupling with diisopropenylbenzene.

7. An oil composition, comprising a lubricating oil, and a viscosity modifying amount of a star polymer produced by a process comprising the steps of:

polymerizing isobutylene with an initiator to form living polymers, and coupling the living polymers after polymerization of above 70% but not higher than 95% of the isobutylene to give an average of at least 3 polymeric arms per molecule.

8. The oil composition of claim 7, wherein the polymeric arms consist of polymerized isobutylene having a peak molecular weight from 500 to 1,000,000.

9. The oil composition of claim 7, wherein the isobutylene is polymerized to between 80% and 93% completion before coupling with diisopropenylbenzene.

* * * * *